2,946,401
ENTRAINMENT SEPARATOR
Herbert Edward Serner, Mahwah, N.J.
(P.O. Box 232, Oakland, N.J.)
Filed Oct. 13, 1958, Ser. No. 766,857
11 Claims. (Cl. 183—110)

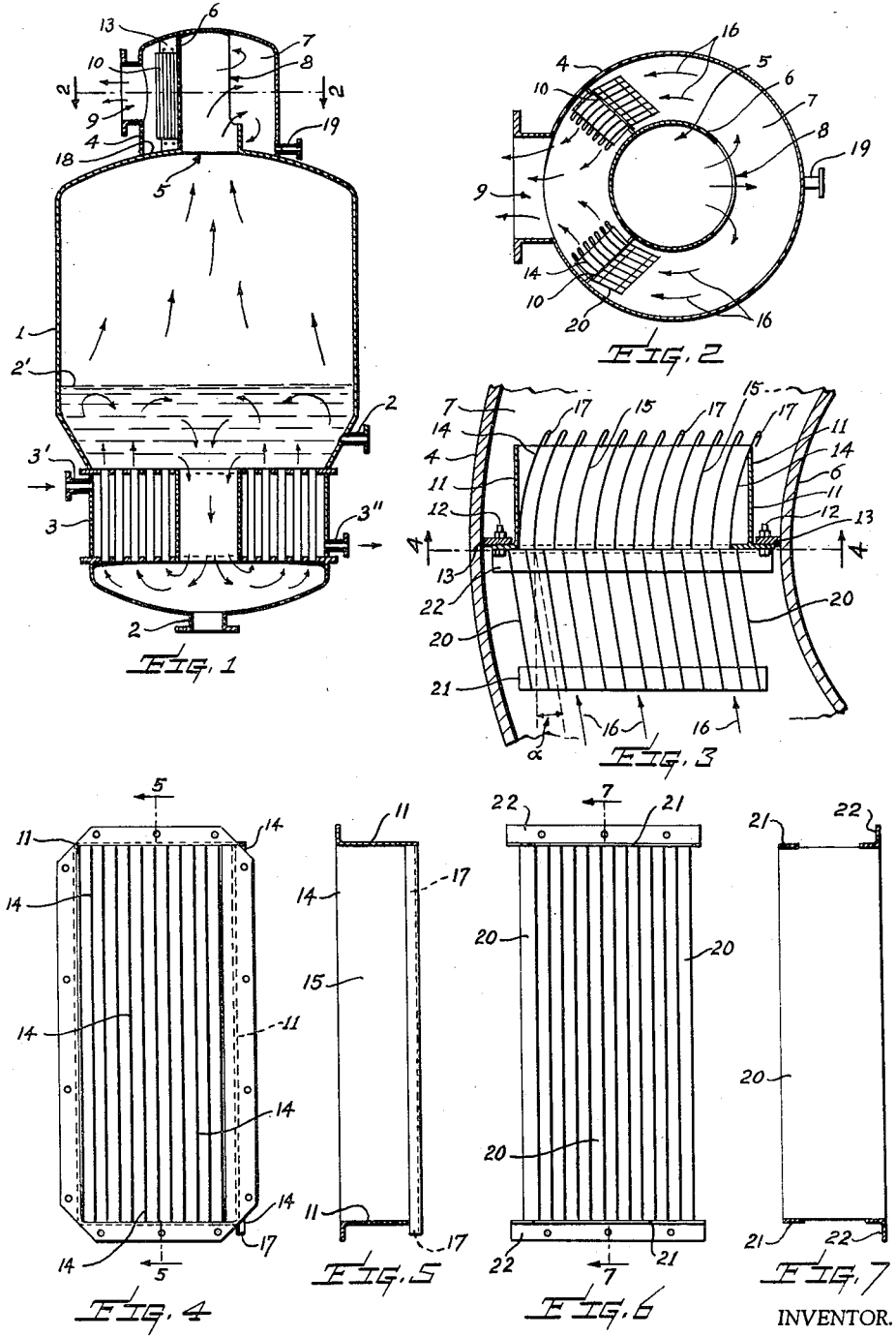
July 26, 1960     H. E. SERNER     2,946,401
ENTRAINMENT SEPARATOR
Filed Oct. 13, 1958     2 Sheets-Sheet 1
INVENTOR.
Herbert Edward Serner

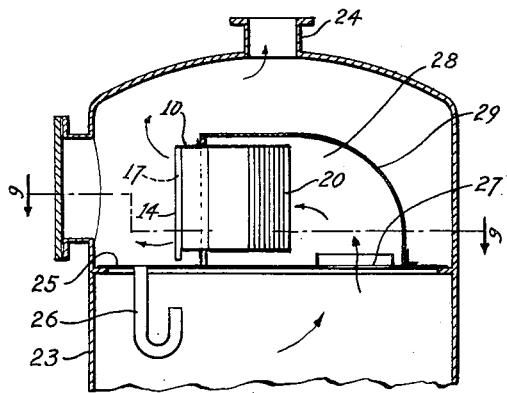
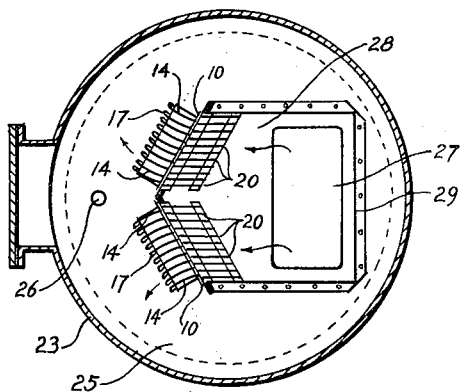
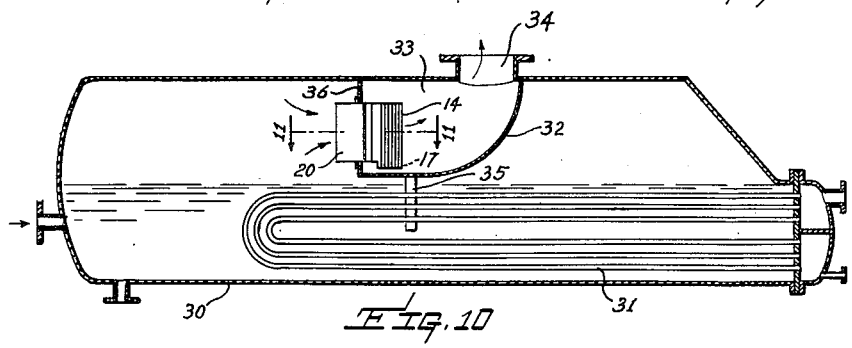
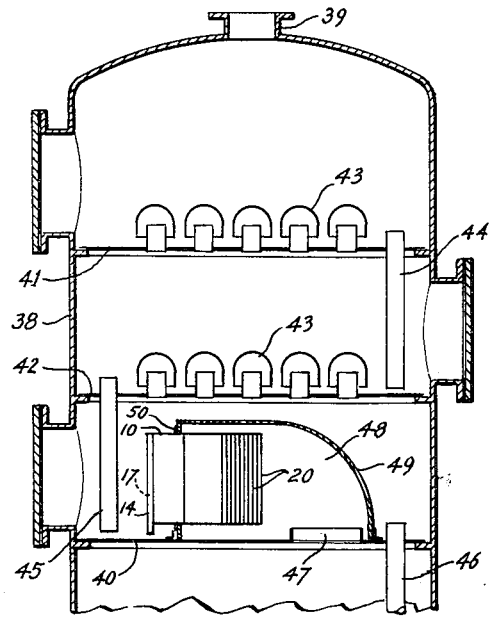
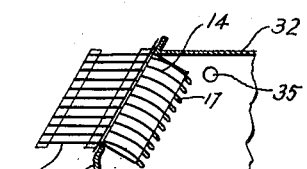
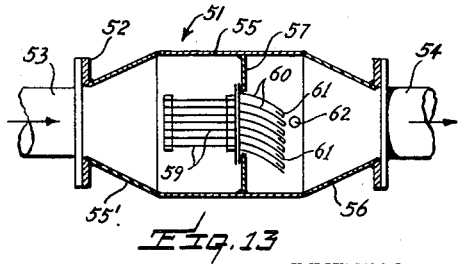
INVENTOR.
Herbert Edward Serner United States Patent Office 2,946,401
Patented July 26, 1960

My invention relates to entrainment separators or catchalls or demisters, used in connection with steam boilers, fractionating columns, stripping stills and columns, absorption towers and similar devices in which vapors or gases, rising through layers of liquid, carry along liquid droplets as entrainment.

Objects and advantages of the invention will be set forth in part hereinafter and in part will be obvious therefrom, or may be learned by practice with the invention, the same being realized and attained by means of the combinations, improvements and instrumentalities pointed out in the appended claims.

The invention consists in the novel parts, constructions, arrangements, combinations and improvements herein shown and described.

It is the purpose of such a separator to remove the entrained liquid droplets from the vapor or gas stream. Conventional devices used for this purpose are mostly of three types:

(1) They consist of a series of zig-zag or irregularly shaped baffles, placed in the path of the vapor or gas stream. The entrained liquid droplets, impinging on these baffle surfaces tend to adhere thereto, but the effectiveness of such separators is limited because the great turbulence and eddy-currents imparted to the vapor stream by such baffles tends to re-entrain a portion of the liquid that has previously been deposited on the surfaces of these baffles. The tortuous path of the vapor stream through a series of such baffles also results in an appreciable pressure drop.

(2) They may consist of a chamber in which the entering vapor or gas is forced to follow an annular path so that any entrainment in the stream will be separated by centrifugal force. In this case the velocity of the stream must be of great magnitude to force the entrained droplets for a considerable distance radially through this stream of vapor or gas to the surfaces surrounding the periphery of the chamber. The high velocity required results in an appreciable pressure drop, and at low velocities the operation of such a device is very inefficient.

(3) They may consist, in the case of the so-called demisters, of a layer or layers of wire-mesh or suitably expanded sheets of metal or other suitable material, on which the entrained droplets in the stream are deposited. These demister blankets are always placed in a horizontal position at right angle to the rising stream; the entrained droplets are deposited on, or in, this blanket, eventually dropping back in the opposite direction to the rising vapor stream. The successful operation of this type of separator is limited to low velocities which, when exceeded, will force the separated liquid upward through the blanket, allowing it to re-enter the vapor stream.

My invention prevents the objectionable features of such separators by the provision of a series of more or less equally spaced, curved baffles arranged in more or less vertical position with respect to their longitudinal axis, and presenting their concave surface to the oncoming vapor-stream at a slight angle of incidence. The vertical edge of each baffle, on the down-stream side, is turned back about 180° to form a trough in which the liquid, deposited on the baffle surface, collects and is discharged from the bottom of these troughs through the action of gravity. In order to function effectively, the oncoming stream must travel in a substantially straight path, and with the least possible turbulence. Under such conditions such a single row of properly proportioned baffles operates with high efficiency over a very wide range of stream-velocities.

These operating conditions limit the practical application of such a baffle arrangement to a more or less horizontal vapor stream traveling in a substantially straight path. My invention permits the effective use of this type of baffle arrangement irrespective of the general direction of the oncoming stream and any turbulence that may exist within the stream. I accomplish this by placing ahead of these curved baffles a series of straight vertical baffles, straightening vanes, spaced in staggered relation to the curved baffles.

If the straight baffles were merely an extension of the curved baffles, being integral with them, the purpose of the apparatus would be defeated, because the liquid droplets carried along by the stream in turbulent or irregular flow would tend to adhere to both sides of each baffle, and any liquid reaching the convex side of the curved baffle portion would not be prevented from re-entering the vapor or gas stream on the down-stream side of the baffles.

When the vertical, straight baffles or straightening vanes are entirely separate from the curved baffles, and placed in staggered relation to these curved baffles, any portion of the entrained liquid that has been deposited on either side of the straight baffles, when leaving the trailing edge of these straightening vanes will enter the spaces between the curved baffles and continue toward the concave surface of the curved baffles, eventually entering the collecting trough from which it will be discharged, by the action of gravity, into a section or compartment from which it can not reenter the vapor or gas stream.

This arrangement is highly effective over a very wide range of velocities. Since it presents minimum obstruction to the vapor or gas stream the actual pressure drop through the apparatus is negligibly small; at the same time the effectiveness of the apparatus is very great, because re-entrainment is prevented.

In order to facilitate installation and/or removal of the device, baffle units can be made in standard sections small enough to permit introduction or removal through a suitable access opening in the column, tower, drum, or duct in which they may be placed.

In the accompanying drawings which form part of the instant specification and in which like numbers refer to like parts throughout the several views:

Fig. 1 is a view in section along the vertical medial plane of a vertical evaporator embodying a preferred form of dual unit entrainment separator of my invention, the view showing one of the pair of entrainment separator units depicted in Fig. 2;

Fig. 2 is a view in section and to a somewhat larger scale, taken along the line 2—2 of Fig. 1 and showing the arrangement of the pair of entrainment separator units in the vessel;

Fig. 3 is a fragmentary sectional view to a still larger scale, of one of the separator units of Fig. 2;

Fig. 4 is a view in front elevation to a somewhat smaller scale than that of Fig. 3, of the curved vane baffle unit of Fig. 3 taken along the line 4—4 of Fig. 3;

Fig. 5 is a view in section taken along the line 5—5 of Fig. 4;

Fig. 6 is a view in front elevation of the straight vane baffle unit of Fig. 3;

Fig. 7 is a view in section taken along the line 7—7 of Fig. 6;

Fig. 8 is a fragmentary view in section taken along the vertical medial plane of a gas-liquid contacting column embodying a dual unit entrainment separator of my invention; the view showing one of the pair of entrainment separator units depicted in Fig. 9;

Fig. 9 is a view in section taken along the line 9—9 of Fig. 8;

Fig. 10 is a view in section along the vertical longitudinal medial plane of a horizontal evaporator embodying a single unit entrainment separator of my invention;

Fig. 11 is a fragmentary view in section of the entrainment separator of Fig. 10 taken along the line 11—11 of Fig. 10;

Fig. 12 is a fragmentary view in section taken along the vertical medial plane of a fractionating column embodying a dual unit entrainment separator of my invention, such as that shown in Fig. 9; and Fig. 13 is a fragmentary view in section of a vapor transfer pipe embodying a single unit entrainment separator of my invention, the view being taken along a longitudinal medial plane of the pipe at right angles to the plane of the straightening vanes.

Referring now more particularly to Figs. 1 to 7 inclusive, the evaporator 1 is adapted to be supplied with water or other liquid to be evaporated through the bottom or side inlet ports 2, to the liquid level 2'. Heating fluid, e.g. steam, is supplied by inlet port 3' to a heat-exchanging section 3, and removed via outlet port 3''. Vapor generated from the liquid body in the interior of the vessel rises into a central vapor dome 4 to which entry of the vapor stream is afforded through a port 5.

The vapor dome 4 is annularly partitioned by means of a cylindrical wall 6 also concentric with the evaporator 1 to provide an arcuate vapor path 7 leading in opposite directions from an inlet port 8 in the wall 6 to a diametrically opposite vapor outlet port 9 in the dome 4.

A pair of entrainment separator units 10 of my invention are disposed in the vapor path 7 at opposite sides of the vapor outlet port 9, the units being one right-hand and the other left-hand but otherwise identical so that a description of one will suffice for both.

Referring now more particularly to Figs. 3 to 7, it will be observed that the entrainment separator 10, as here preferably embodied, comprises a marginally flanged rectangular baffle frame 11 which is vertically disposed in the vapor path 7 and secured, preferably removably, at its top, bottom and sides, as by means of bolts 12, to mounting flanges 13 carried by the inner partition wall 6, the dome 4 and the vessel 1.

A series of more or less equally spaced, curved elongated baffles 14 are arranged in and carried by the frame 11 in a more or less vertical position with respect to their longitudinal axis and present their concave surface 15 to the on-coming vapor stream, indicated by the arrows 16, at a slight angle of incidence, α. The vertical edge of each curved baffle on the down-stream side, is turned back about 180° to form a trough 17 in which liquid of the vapor stream, deposited on the baffle surface, collects and is drained from the bottom of these troughs, through the action of gravity, onto the floor 18 of the dome 4. A drainage port 19 is provided on the dome for discharging the drainage liquid from the dome.

A series of straight, vertical baffles 20 are placed ahead of the curved baffles 14, that is, up-stream of the curved baffles. These straight baffles or straightening vanes are more or less equally spaced from each other and are secured together in this arrangement at top and bottom as by rigid connecting bars 21 at their up-stream or front edge and by mounting flanges 22 at their downstream or back edge. This assembly is bolted or otherwise suitably secured, preferably removably, to the same top and bottom mounting flanges 13 which support the assembly of curved baffles 14.

The assembly of the straight vertical baffles 20 when in position ahead of the assembly of the curved baffles 14, that is, upstream of the curved baffles, is such that the straight baffles 20 will be spaced in staggered relation to, and preferably centrally between, the curved baffles 14. Thus, as is best seen in Fig. 3, the vertical, straight baffles 20 or straightening vanes 20 are not merely an up-stream extension of the curved baffles 14, but are entirely separate from and in staggered relation to these curved baffles. Hence, any portion of the entrained liquid that has been deposited on either side of the straight baffles, will, when leaving the trailing edge of these straight baffles or straightening vanes, enter the spaces between the curved baffles and continue toward the concave surface 15 of the curved baffles, eventually entering the collecting trough 17 from which it will be discharged, by the action of gravity, onto the floor 18 of the dome and be discharged therefrom via the port 19 so that it cannot re-enter the vapor gas stream.

In the modified arrangement shown in Figs. 8 and 9, the entrainment separator, again consisting of a pair of right-hand and left-hand entrainment units 10, is shown with the individual units disposed in a substantially side-by-side fashion in the top portion of a contacting column 23 from which an overhead vapor stream is adapted to be discharged via an outlet port 24. In order to separate entrained liquid from the rising vapor stream, the top portion of the column is constructed and arranged to serve as an entrainment separator in accordance with my invention. To this end the column 23 is partitioned by a deck 25 from which liquid may be drained continuously as it accumulates, by a down-comer 26 having a liquid seal trap. The deck 25 is provided with an opening 27 through which the rising vapor stream flows upwardly into a chamber 28 formed by the deck 25 and a hood 29.

The hood 29 is provided with a front opening in which is received the pair of entrainment separator units 10, so that the entire vapor stream entering the chamber 28 must flow through the separator units 10 en route to the vapor outlet port 24.

The combination of the straight baffles 20 at the upstream side of the unit with and in staggered relation to the curved baffles 14 at the downstream side of the unit operates, just as in the embodiment of Fig. 1, to separate the entrained liquid from the vapor stream and deposit it on the deck 25 from which it is removed via the downcomer 26.

In the embodiment shown in Fig. 10, an evaporator shell 30 having the heating tube bundle 31 is partitioned by means of a hood 32 to provide a chamber or passage 33 for conducting vapor generated in the shell to an outlet port 34. The hood 32 is provided with a drain opening in its floor from which a drain pipe 35 extends for a distance downwardly into the shell space sufficient to ensure that the bottom of the pipe will be below the level of liquid undergoing evaporation in the shell and thus provide a liquid seal. A front wall 36 of the hood 32 is apertured to receive the entrainment separator unit 10 with its set of curved baffles 14 and its set of straight baffles 20 inclined to the curved baffles. The vapor stream entering the separator between the straight baffles 20 is directed thereby between the curved baffles and caused by the latter to give up the liquid droplets entrained in the stream. The separated liquid collecting in the pockets 17 at the down-stream edge of the curved baffles drains therefrom onto the floor of the hood and is returned through the pipe 35 into the body of liquid in the evaporator. The vapor stream freed of liquid continues on through the hood and leaves the evaporator through the port 34.

In Fig. 12, a fractionating column 38 having the vapor outlet port 39 is provided with the entrainment separator of this invention at a point in the column between fractionating trays so as to remove entrained liquid droplets from the vapor stream rising from one tray to the next higher tray. As shown, the column 38 is provided with an entrainment separating deck 40 immediately below a pair of fractionating trays 41 and 42 by which final fractionation of the dried vapor stream may be effected before it leaves the column. The trays 41 and 42 are provided each with any suitable form of bubble cap devices 43 and downcomers 44 and 45 respectively, through which liquid on the tray courses downwardly from the tray 41 to the tray 42 and from the latter to the entrainment separating deck 40. Liquid collecting on the latter drains therefrom to the next lower tray (not shown) by means of downcomer 46.

The deck 40 is provided with an aperture 47 through which vapor with its content of liquid particles to be removed, rises into a chamber 48 formed by a hood 49 and the deck 40. The hood is apertured at its front wall 50 to receive one or more entrainment separating units 10. Preferably a pair of such units in side-by-side relationship are employed after the manner of the entrainment separator of Figs. 8–9. Thus, liquid which is separated and collected in the troughs 17 drains downwardly therefrom onto the deck 40. The dried vapor issuing from between the curved vanes 14 flows upwardly through the overlying tray 42 for further fractionation. It will be observed that the normal downward flow of liquid from tray-to-tray and the upward flow of vapor is substantially unaffected and that the "cleaning-up" of the vapor stream is effected just prior to its final fractionation and discharge from the column.

In the embodiment of this invention depicted in Fig. 13, a form of entrainment separator is shown applied in a steam line, for the purpose of drying wet steam in transit therethrough. As embodied, the separator comprises a pipe section 51 having at each end a standard coupling flange 52 by which it may be inserted and bolted or otherwise connected to and between the pipe sections 53 and 54 of the steam line as and where required. Steam flows through the line in the direction shown by the arrows. The separator 51 is preferably of larger diameter throughout the central portion 55 of its length than at its end portions 55 and 56, being tapered from the central portion to its ends as required to connect with the standard pipe sections 53 and 54. The central portion 55 is partitioned at right angles to its longitudinal axis by means of a partition 57 which is imperforate except for a central opening of a size to receive the separator vane assembly comprising the set of straight parallel straightening vanes 59 at the upstream side of the partition, and the set of spaced curved separating vanes 60 at the downstream side of the partition. The straightening vanes 59 are disposed as shown in staggered relation to the curved vanes 60, preferably centrally between the latter after the manner more clearly shown in Fig. 3. Liquid which is separated from the passing stream of steam drains downwardly from the troughs 61 to the floor of the central section 55 from which the liquid is drained in turn from the pipe line through a drain port 62 in the floor. The port 62 may be connected to a suitable liquid seal line or trap (not shown) operative to prevent any loss of dried steam from the line while enabling continuous removal of separated water therefrom.

It will be understood that in the application of the entrainment separator of my invention to the various uses for which it is intended, the design features will be a function of the nature and quantity of the fluid being processed, its velocity, liquid content and temperature. Thus, the precise degree of curvature of the curved separating vanes, their spacing from each other and their length, the length of the straightening vanes and the angle of incidence between the straightening vanes and the curved vanes will necessarily vary from one installation to another.

What is claimed is:

1. Apparatus for separating liquid particles from vapor containing such particles, comprising wall means forming a vapor-conducting passageway, at least one baffle unit disposed in said passageway, each said unit comprising a vertically disposed curved vane and a vertically disposed straight vane, said curved vane having a concave surface, a leading edge, a trailing edge and a vertically disposed liquid-collecting trough at its trailing edge, and said straight vane being located up-stream of said curved vane in horizontally offset relation thereto, and at a small angle of incidence to the tangent of said concave surface at said leading edge, for directing vapor approaching said leading edge against the concave surface only of said curved vane.

2. Apparatus for separating liquid particles from vapor containing such particles, comprising wall means forming a vapor-conducting passageway leading to a vapor escape opening; at least one baffle unit at said opening, each said unit comprising a vertically disposed straight vane at the up-stream side of said opening and a vertically disposed curved vane at the downstream side, said curved vane having a concave surface, a leading edge, a trailing edge and a vertically disposed liquid-collecting trough at its trailing edge, and said straight vane being locted upstream of said curved vane in horizontally offset relation to said curved vane, and at a small angle of incidence to the tangent of said concave surface at said leading edge, for directing vapor approaching said leading edge along said passageway, against the concave surface only of said curved vane.

3. Apparatus for separating liquid particles from a vapor stream containing such particles: comprising wall members forming a chamber for collecting liquid separated from said vapor and having an inlet opening to the chamber for said vapor stream, a vapor outlet opening and a liquid drainage opening, at least one vertically disposed curved vane having a concave surface, a leading edge and having a trailing edge provided with a vertically disposed liquid-collecting trough, said vane being disposed with its leading edge adjacent said inlet opening and with said collecting trough in said chamber; and at least one vertically disposed straight vane having a leading edge and a trailing edge, said straight vane being disposed with its leading edge outside said chamber and with its trailing edge adjacent said inlet opening in staggered relation to the leading edge of said curved vane and at a small angle of incidence to the tangent of said concave surface at the leading edge of said curved vane, for directing vapor approaching said inlet opening against the concave surface only of said curved vane.

4. Apparatus according to claim 3 for separating liquid particles from a vapor stream containing said particles, in which there is a set of at least two curved vanes, said vanes being substantially equally spaced from each other and each having a liquid-collecting trough; and, in which there is a set of at least two straight vanes located upstream of said set of curved vanes, the vanes of one set being staggered in relation to the vanes of the other.

5. Apparatus in accordance with claim 4, the straight vanes being substantially equally spaced from each other to substantailly the same spacing as the curved vanes; and in which the staggering is such that the ends of the vanes of one set are centrally located between the adjacent ends of the vanes of the other set.

6. In a fractionating column, a liquid collecting deck partitioning said column, said deck having an opening for the upward passage of vapor therethrough and a separate opening for the downward passage of liquid therethrough; hood means carried by said deck forming a chamber to be supplied with vapor through said vapor opening, said hood means having a vapor escape opening; a baffle assembly supported at said vapor escape opening, said baffle assembly comprising a set of straight, parallel, equally spaced vanes at the inlet side of said vapor escape opening and a companion set of curved equally spaced vanes at the outlet side of said vapor escape opening, said sets being staggered in relation to each other and the straight vanes being at a small angle of incidence to the curved vanes.

7. In a fractionating column in accordance with claim 6, said deck constituting the uppermost deck of the column.

8. In a fractionating column in accordance with claim 6, said deck being intermediate a pair of fractionating decks.

9. In a vertical evaporator, the combination with an apertured top wall of a housing supported by said top wall and having a vapor outlet opening; wall means partitioning said housing and providing an annular vapor passage connecting said apertured top wall with said vapor outlet opening; and a baffle assembly in said annular passage comprising a plurality of baffle units each having a set of curved vanes and a set of straight vanes upstream of the curved vanes, the sets being in staggered relation to each other and the straight vanes being at a slight angle of incidence to the curved vanes.

10. In a horizontal evaporator, an entrainment separating device comprising, in combination with the shell of the evaporator, wall means forming therewith a vapor outlet passageway, and a baffle assembly in said passageway comprising a set of straight equally spaced vanes and, downstream thereof, a set of curved equally spaced vanes disposed in staggered relation to said straight vanes.

11. In a steam line, the combination with a pair of individual pipe sections of said line, of an entrainment separating unit comprising a pipe section of enlarged cross-section inserted between said individual pipe sections and a baffle assembly in said inserted pipe section comprising a set of straight, equally spaced, vertically arranged vanes and, downstream thereof, a set of curved, equally spaced, vertically arranged vanes disposed in staggered relation to said straight vanes, said enlarged pipe section having a liquid drainage port beneath said set of curved vanes.

References Cited in the file of this patent

UNITED STATES PATENTS

| | | |
|---|---|---|
| 960,374 | Muchka | June 7, 1910 |
| 1,181,470 | Massip | May 2, 1916 |
| 1,405,613 | Milliken | Feb. 7, 1922 |
| 2,143,191 | Fletcher et al. | Jan. 10, 1939 |
| 2,256,115 | Hobbs | Sept. 16, 1941 |